(12) United States Patent
Yamazaki

(10) Patent No.: US 7,436,463 B2
(45) Date of Patent: Oct. 14, 2008

(54) DISPLAY DEVICE

(75) Inventor: Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/648,571

(22) Filed: Jan. 3, 2007

(65) Prior Publication Data
US 2007/0263133 A1 Nov. 15, 2007

Related U.S. Application Data

(62) Division of application No. 11/187,809, filed on Jul. 25, 2005, now Pat. No. 7,190,428, which is a division of application No. 09/748,166, filed on Dec. 27, 2000, now Pat. No. 6,927,826, which is a division of application No. 09/295,397, filed on Apr. 21, 1999, now Pat. No. 6,593,990, which is a division of application No. 09/045,697, filed on Mar. 23, 1998, now Pat. No. 6,115,090.

(30) Foreign Application Priority Data
Mar. 26, 1997 (JP) .................................. 9-092935

(51) Int. Cl.
G02F 1/136 (2006.01)
G02F 1/1343 (2006.01)
(52) U.S. Cl. .............................. 349/43; 349/38; 349/139
(58) Field of Classification Search ............. 349/42–43, 349/38–39, 139
See application file for complete search history.

(56) References Cited

U.S. PATENT DOCUMENTS

| 4,254,426 A | 3/1981 | Pankove |
| 4,448,491 A | 5/1984 | Okubo |
| 4,650,922 A | 3/1987 | McPherson |
| 4,705,358 A | 11/1987 | Yamazaki et al. |
| 4,722,913 A | 2/1988 | Miller |
| 4,804,490 A | 2/1989 | Pryor et al. |
| 4,845,533 A | 7/1989 | Pryor et al. |
| 4,869,755 A | 9/1989 | Huschka |
| 4,972,250 A | 11/1990 | Omori et al. |
| 5,101,288 A | 3/1992 | Ohta et al. |
| 5,117,299 A | 5/1992 | Kondo et al. |

(Continued)

FOREIGN PATENT DOCUMENTS

EP 0 221 531 5/1987

(Continued)

OTHER PUBLICATIONS

R.C.A. Review, vol. 43, No. 4, Dec. 1982, pp. 665-674, J. Zelez, "A Diamond-Like Carbon Film."

Primary Examiner—Dung T. Nguyen
(74) Attorney, Agent, or Firm—Eric J. Robinson; Robinson Intellectual Property Law Office, P.C.

(57) ABSTRACT

There is disclosed a structure for radiating heat generated by TFTs in a liquid crystal panel. A DLC film 125 is provided on a resin interlayer film 123 disposed on the TFTs 105, 109, and 113. The DLC film 125 can be easily formed on the resin film, and has high heat conductivity, so that the film can be made to function as a heat radiating layer.

29 Claims, 3 Drawing Sheets

U.S. PATENT DOCUMENTS

| | | | |
|---|---|---|---|
| 5,176,791 A | 1/1993 | Itoh et al. | |
| 5,196,954 A | 3/1993 | Yamazaki et al. | |
| 5,250,451 A | 10/1993 | Chouan | |
| 5,330,616 A | 7/1994 | Yamazaki | |
| 5,392,143 A | 2/1995 | Akiyama et al. | |
| 5,422,658 A | 6/1995 | Kawaguchi et al. | |
| 5,432,527 A | 7/1995 | Yanai et al. | |
| 5,461,501 A | 10/1995 | Sato et al. | |
| 5,536,950 A | 7/1996 | Liu et al. | |
| 5,550,066 A | 8/1996 | Tang et al. | |
| 5,572,046 A | 11/1996 | Takemura | |
| 5,583,369 A | 12/1996 | Yamazaki et al. | |
| 5,585,951 A | 12/1996 | Noda et al. | |
| 5,621,556 A | 4/1997 | Fulks et al. | |
| 5,652,029 A | 7/1997 | Itoh | |
| 5,686,328 A | 11/1997 | Zhang et al. | |
| 5,686,980 A | 11/1997 | Hirayama et al. | |
| 5,696,386 A | 12/1997 | Yamazaki | |
| 5,706,067 A | 1/1998 | Colgan et al. | |
| 5,712,495 A | 1/1998 | Suzawa | |
| 5,717,224 A | 2/1998 | Zhang | |
| 5,724,107 A | 3/1998 | Nishikawa et al. | |
| 5,739,549 A | 4/1998 | Takemura et al. | |
| 5,747,830 A | 5/1998 | Okita | |
| 5,748,165 A | 5/1998 | Kubota et al. | |
| 5,766,696 A | 6/1998 | Itoh | |
| 5,777,701 A * | 7/1998 | Zhang | 349/44 |
| 5,784,201 A | 7/1998 | Lee et al. | |
| 5,808,315 A | 9/1998 | Murakami et al. | |
| 5,815,231 A | 9/1998 | Nishi et al. | |
| 5,818,550 A * | 10/1998 | Kadota et al. | 349/43 |
| 5,820,947 A | 10/1998 | Itoh | |
| 5,847,410 A | 12/1998 | Nakajima | |
| 5,851,862 A | 12/1998 | Ohtani et al. | |
| 5,856,689 A | 1/1999 | Suzawa | |
| 5,871,847 A | 2/1999 | Itoh | |
| 5,879,741 A | 3/1999 | Itoh | |
| 5,926,242 A * | 7/1999 | Kataoka et al. | 349/117 |
| 5,952,708 A | 9/1999 | Yamazaki | |
| 5,963,278 A | 10/1999 | Yamazaki et al. | |
| 5,989,672 A | 11/1999 | Hayashi | |
| 5,990,491 A | 11/1999 | Zhang | |
| 5,990,542 A | 11/1999 | Yamazaki | |
| 5,995,189 A | 11/1999 | Zhang | |
| 6,001,431 A | 12/1999 | Itoh et al. | |
| 6,005,648 A | 12/1999 | Zhang et al. | |
| 6,055,034 A | 4/2000 | Zhang et al. | |
| 6,097,459 A | 8/2000 | Shimada et al. | |
| 6,110,542 A | 8/2000 | Miyanaga et al. | |
| 6,114,715 A | 9/2000 | Hamada | |
| 6,115,090 A | 9/2000 | Yamazaki | |
| 6,133,073 A | 10/2000 | Yamazaki et al. | |
| 6,163,055 A | 12/2000 | Hirakata et al. | |
| 6,165,582 A | 12/2000 | Hayashi | |
| 6,169,293 B1 | 1/2001 | Yamazaki | |
| 6,171,674 B1 | 1/2001 | Yamazaki et al. | |
| 6,183,816 B1 | 2/2001 | Yamazaki et al. | |
| 6,194,047 B1 | 2/2001 | Hayashi | |
| 6,207,281 B1 | 3/2001 | Itoh | |
| 6,217,661 B1 | 4/2001 | Hirose et al. | |
| 6,224,952 B1 | 5/2001 | Itoh | |
| 6,239,470 B1 | 5/2001 | Yamazaki | |
| 6,249,330 B1 | 6/2001 | Yamaji et al. | |
| 6,249,333 B1 | 6/2001 | Zhang et al. | |
| 6,252,297 B1 | 6/2001 | Kemmochi et al. | |
| 6,258,434 B1 | 7/2001 | Hayashi | |
| 6,261,634 B1 | 7/2001 | Itoh | |
| 6,265,070 B1 | 7/2001 | Itoh | |
| 6,323,918 B1 * | 11/2001 | Yoshioka et al. | 349/48 |
| 6,423,383 B1 | 7/2002 | Hirose et al. | |
| 6,441,468 B1 | 8/2002 | Yamazaki | |
| 6,445,059 B1 | 9/2002 | Yamazaki | |
| 6,468,617 B1 | 10/2002 | Yamazaki et al. | |
| 6,596,990 B2 | 7/2003 | Kasten et al. | |
| 6,621,535 B1 | 9/2003 | Fukada | |
| 6,927,826 B2 | 8/2005 | Yamazaki | |
| 6,982,768 B2 * | 1/2006 | Ohori et al. | 349/43 |
| 2001/0018097 A1 | 8/2001 | Itoh | |

FOREIGN PATENT DOCUMENTS

| | | |
|---|---|---|
| EP | 0 603 866 | 6/1994 |
| JP | 55-107270 | 8/1980 |
| JP | 58-145134 | 8/1983 |
| JP | 60-145375 | 7/1985 |
| JP | 61-204933 | 9/1986 |
| JP | 61-244068 | 10/1986 |
| JP | 63-015461 | 1/1988 |
| JP | 03-185425 | 8/1991 |
| JP | 03-072711 | 11/1991 |
| JP | 04-027690 | 5/1992 |
| JP | 04-027691 | 5/1992 |
| JP | 04-177873 | 6/1992 |
| JP | 05-002187 | 1/1993 |
| JP | 05-235350 | 9/1993 |
| JP | 05-241201 | 9/1993 |
| JP | 05-259891 | 10/1993 |
| JP | 06-242433 | 9/1994 |
| JP | 07-146491 | 6/1995 |
| JP | 09-311342 | 12/1997 |
| JP | 10-010578 | 1/1998 |
| JP | 11-000052 | 3/1999 |

* cited by examiner

DISPLAY DEVICE

This application is a divisional of application U.S. application Ser. No. 11/187,809 filed Jul. 25, 2005, now U.S. Pat. No. 7,190,428, which is a divisional application of U.S. application Ser. No. 09/748,166 filed Dec. 27, 2000 now U.S. Pat. No. 6,927,826, which is a divisional application of U.S. application Ser. No. 09/295,397 filed Apr. 21, 1999 now U.S. Pat. No. 6,593,990, divisional application of U.S. application Ser. No. 09/045,697, filed Mar. 23, 1998, now U.S. Pat. No. 6,115,090.

BACKGROUND OF THE INVENTION

1. Field of the Invention

The present invention relates to the structure of a reflection type liquid crystal display device.

2. Description of the Related Art

A reflection type liquid crystal panel has been known. Also, in an active matrix type liquid crystal panel, there is known a structure in which a peripheral driving circuit is integrated on the same substrate as an active matrix circuit. This structure is known as a peripheral driving circuit integration type.

In a peripheral driving circuit integration type liquid crystal panel, as a result that high picture quality is pursued, a peripheral driving circuit is required to operate at such a high speed as several tens MHz or more.

However, high speed operation causes a problem of heat generation from a device. Especially, since a liquid crystal panel uses a glass substrate or a quartz substrate, the panel has a problem that there is no escape for heat generated by a device (the thermal conductivity of quartz is 1/100 or less than that of single crystal silicon).

Also, a reflection type liquid crystal display panel is easy to secure a required aperture factor even if it is miniaturized. Accordingly, it has been considered to use the display panel for a projection type display.

However, since a liquid crystal panel for a projector is miniaturized (about 3 inches or less in diagonal), the above described problem of heat generation (heat generation from a peripheral driving circuit) especially becomes important.

Specifically, the peripheral driving circuit has such problems that the device characteristic is changed or deteriorated, or the device itself is broken by the heat generated by the circuit itself.

SUMMARY OF THE INVENTION

An object of the present invention is therefore to provide a structure of a display device capable of solving this sort of problem.

According to one aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion; an interlayer insulating film made of resin material and disposed over the thin film transistor; and a carbon film disposed on the interlayer insulating film.

According to another aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion, an interlayer insulating film made of resin material and disposed over the thin film transistor; and a carbon film as a heat releasing layer disposed on the interlayer insulating film.

It is preferable to use a DLC (Diamond-like Carbon) film as the carbon film. The DLC film is a carbon film comprising amorphous carbon having $SP^3$ bonds.

DETAILED DESCRIPTION OF THE INVENTION

Figure 1:
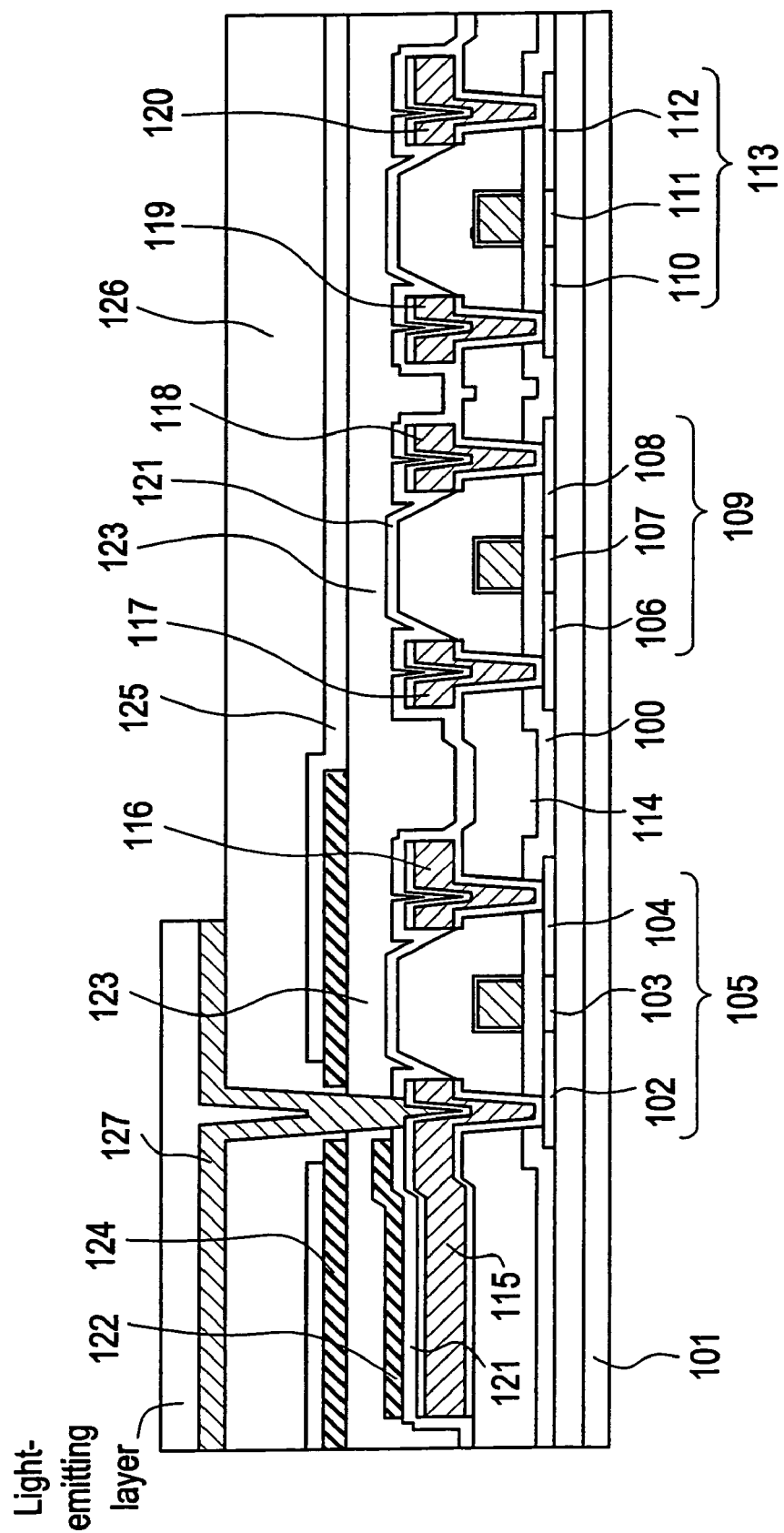
FIG. 1 is a view showing a cross section of a liquid crystal panel.

According to the present invention, as shown in FIG. 1, a DLC film 125 is provided on an interlayer insulating film 123 and a shielding titanium film 124. The DLC film effectively releases heat generated by a pixel TFT 105, and TFTs 109, 113 constituting a peripheral driving circuit.

Embodiment 1

FIG. 1 schematically shows a cross section of a reflection type liquid crystal panel using the present invention. In the drawing, reference numeral 101 denotes a glass substrate. A quartz substrate may be used instead of the glass substrate.

An NTFT 105 (N-channel thin film transistor, also called a pixel TFT) disposed in an active matrix circuit, and a PTFT 109 and an NTFT 113 constituting a peripheral driving circuit are disposed on the glass substrate 101.

A drain region 102, a channel region 103, and a source region 104 are formed in the NTFT 105.

A source region 106, a channel region 107, and a drain region 108 are formed in the PTFT 109.

A source region 112, a channel region 111, and a drain region 110 are formed in the NTFT 113.

The thickness of an active layer of the respective TFTs is made 50 nm. A silicon oxide film with a thickness of 100 nm as a common gate insulating film is provided in the respective TFTs.

The respective TFTs are covered with a silicon oxide film 114 with a thickness of 700 nm as an interlayer insulating film.

A source wiring line 116 brought into contact with the source region 104 of the NTFT 105, and a drain electrode 115 brought into contact with the drain region of the NTFT 105, each made of an aluminum film with a thickness of 500 nm, are disposed on the interlayer insulating film 114.

Also, a source electrode 117 brought into contact with the source region 106 of the PTFT 109 constituting the peripheral driving circuit, and a drain electrode 118 brought into contact with the drain region 108 of the PTFT 109 are disposed.

Also, a source electrode 120 brought into contact with the source region 112 of the NTFT 113 constituting the peripheral driving circuit, a drain electrode 119 brought into contact with the drain region 110 of the NTFT 113 are disposed.

A titanium film with a thickness of 100 nm is formed over and under the electrodes and wiring lines designated by 115, 116, 117, 118, 119, and 120. This film is necessary so as to have an excellent contact.

A silicon nitride film 121 with a thickness of 50 nm is formed to cover the electrodes and wiring lines designated by 115, 116, 117, 118, 119, and 120.

Further, a pattern 122 made of a titanium film is formed. A capacitance is formed by the pattern 122 made of the titanium film and the drain electrode 115 through the silicon nitride film 121.

Reference numeral 123 denotes a polyimide resin film with a thickness of 800 nm. This resin film is provided to absorb roughness formed by the existence of the TFTs, the electrodes, and the wiring lines so that a flattened surface is produced.

Resin material such as polyimide amide, polyamide, acryl, and epoxy may be used other than polyimide.

An electromagnetic shielding pattern 124 made of a titanium film with a thickness of 100 nm is disposed on the interlayer insulating film 123. This electromagnetic shielding pattern is disposed so that a reflecting pixel electrode 127 does not interfere with the source wiring line and the TFT.

A DLC (Diamond-like Carbon) 125 with a thickness of 1000 nm is formed.

Figure 2:
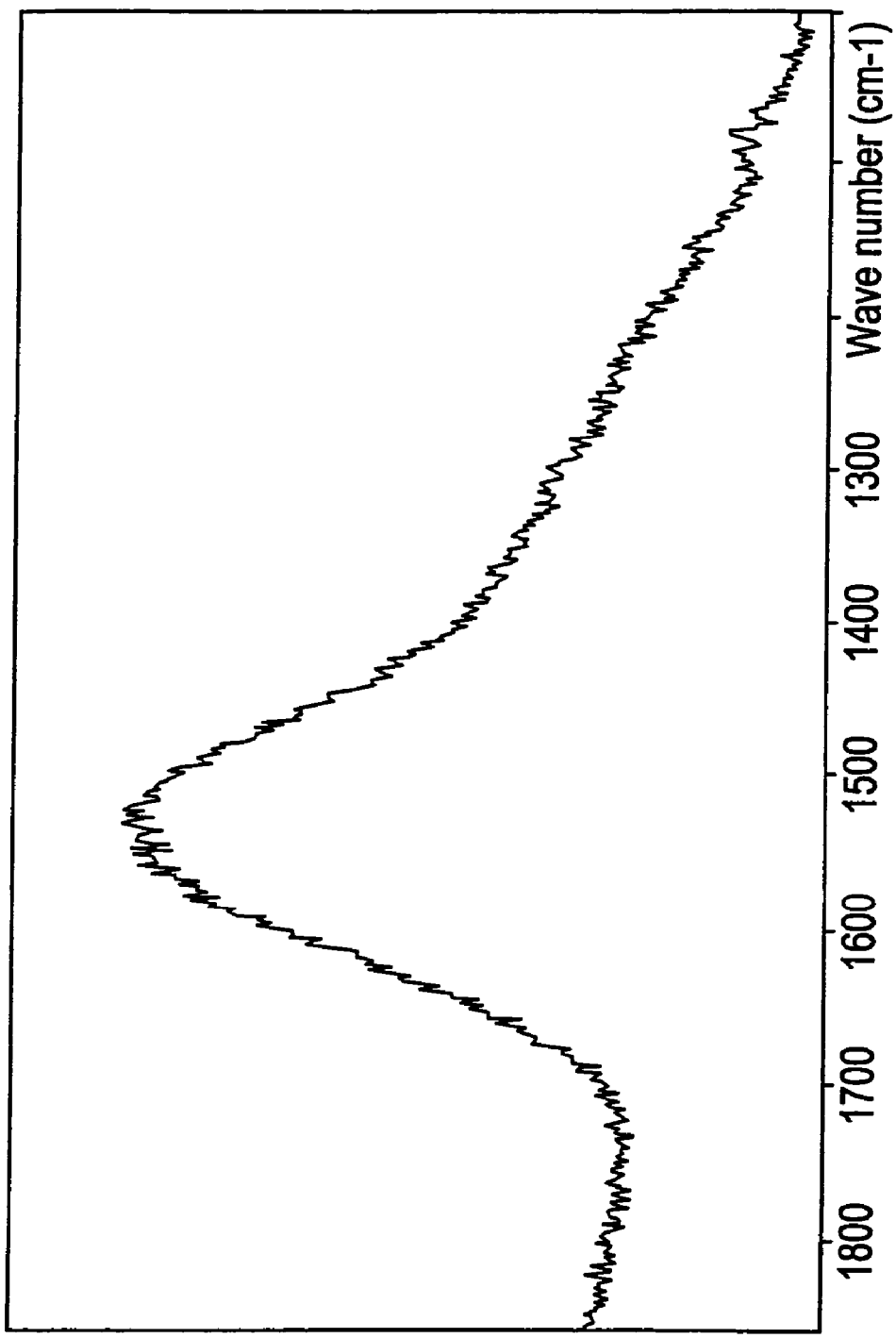
FIG. 2 is a view showing the Raman spectrum of a DLC film.

As the DLC film, it is preferable to use a film which exhibits the Raman spectrum as shown in FIG. 2.

Since the DLC film can be easily formed on the resin material, and has high heat conductivity, the DLC film effectively functions as a heat sink especially for diffusing heat generated by the TFTs of the peripheral driving circuit.

In a reflection type liquid crystal panel, there is no problem even if the DLC film extends to a pixel matrix portion. The adoption of such a structure enables the film to deal with heat generation from not only the peripheral driving circuit but also the pixel matrix portion.

Incidentally, although an AlN film and a diamond film other than the DLC film may be exemplified as a thin film that can be used as a heat sink, the DLC film can be most easily formed on a resin material.

A polyimide resin film 126 with an average thickness of 1 μm as an interlayer insulating film is formed on the DLC film. As shown in FIG. 1, polyimide resin film 126 covers an inside of a contact hole of the DLC film 125. Further, the reflecting pixel electrode 127 having a thickness of 400 nm and made of aluminum, is provided.

In this embodiment, although a top-gate type TFT is shown, a bottom-gate type TFT may be adopted.

Embodiment 2

In this embodiment, examples of display devices using the reflection type liquid crystal panel obtained by using the present invention will be described.

Figure 3A:
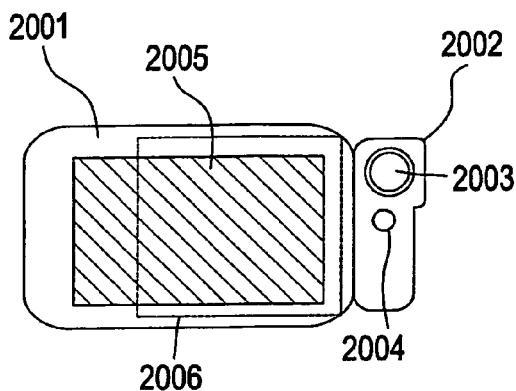
FIGS. 3A to 3F are views schematically showing devices using the present invention.

FIG. 3A shows a portable information processing terminal, which has a communication function using telephone lines.

This device includes an integrated circuit 2006 in the inside of a main body 2001. Further, this device includes a reflection type active matrix liquid crystal panel 2005 in which TFTs as switching elements are disposed, a camera portion 2002 for incorporating a picture image, and an operation switch 2004.

Figure 3B:
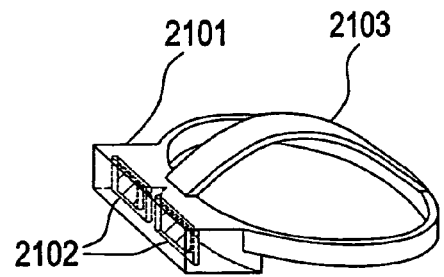

FIG. 3B shows an electric device called a head mount display. This device has a function to display a false picture image in front of eyes when a main body 2101 is mounted on a head through a band 2103. The picture image is formed by active matrix type liquid crystal panels 2102 corresponding to right and left eyes.

Figure 3C:
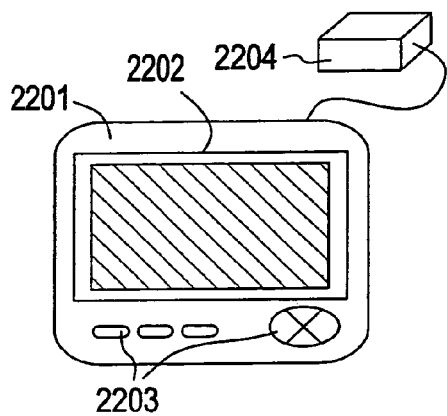

FIG. 3C shows an electric device having a function to display map information and various kinds of information based on signals from an artificial satellite. Information from an artificial satellite is received by an antenna 2204, and is processed by an electric circuit provided in the inside of a main body 2201, and necessary information is displayed on an active matrix type reflection type liquid crystal panel 2202.

The operation of the device is carried out by an operation switch 2203. Even in such a device, a circuit using TFTs is used.

Figure 3D:
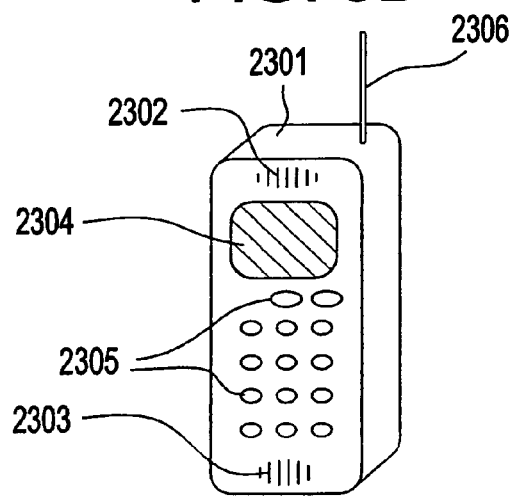

FIG. 3D shows a portable telephone. This electric device includes a main body 2301, an antenna 2306, an audio output portion 2302, a liquid crystal panel 2304, an operation switch 2305, and an audio input portion 2303.

Figure 3E:
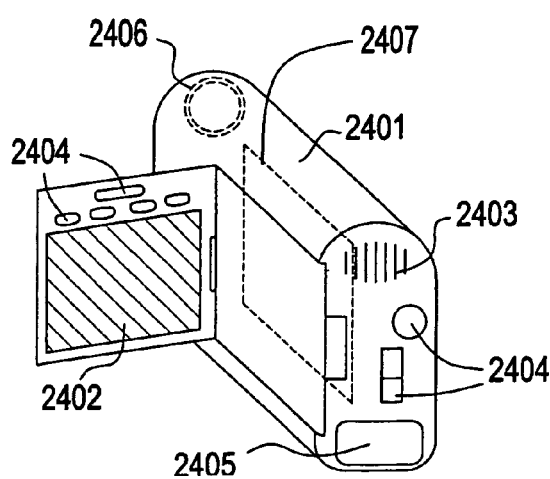

FIG. 3E shows a portable imaging device called a video camera. This device includes a reflection type liquid crystal panel 2402 attached to a close-open member of a main body 2401, and an operation switch 2404 attached to the close-open member.

Further, the main body 2401 is provided with an image receiving portion 2406, an integrated circuit 2407, an audio input portion 2403, an operation switch 2404, and a battery 2405.

Figure 3F:
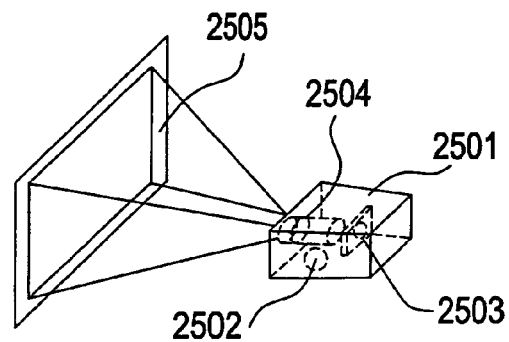

FIG. 3F shows a projection type liquid crystal display device. This device includes a main body 2501 provided with a light source 2502, a reflection type liquid crystal panel 2503, and an optical system 2504, and has a function to project a picture image onto a screen 2505.

It should be noted that the present invention can also be used for a flat panel display other than the case of using a liquid crystal. For example, in an EL display, the present invention can be used when an under layer of a light emitting layer is flattened. The present invention can also be used for an EC display and the like.

That is, the present invention can be used for realizing the structure in which a surface over a pixel region is desired to be flat.

As described above, by using the present invention, it is possible to provide a structure in which heat generated by a peripheral driving circuit can be effectively radiated. Also it is possible to provide a structure in which heat generated in the inside of a liquid crystal panel can be effectively radiated.

What is claimed is:

1. A display device comprising:
a substrate;
a thin film transistor formed over the substrate;
a first insulating film formed over the thin film transistor, the first insulating film having a first contact hole;
an electrode formed over the first insulating film, the electrode being in contact with one of a source region and a drain region of the thin film transistor through the first contact hole;
a second insulating film formed over the electrode, the second insulating film comprising silicon nitride and having a second contact hole;
a capacitance electrode formed over the second insulating film;
a third insulating film formed over the capacitance electrode, the third insulating film having a third contact hole;
an electromagnetic shielding pattern formed over the third insulating film;
a fourth insulating film formed over the electromagnetic shielding pattern, the fourth insulating film having a fourth contact hole; and
a pixel electrode formed over the fourth insulating film, the pixel electrode being in contact with the electrode through the second contact hole, the third contact hole and the fourth contact hole, and being in contact with the second insulating film, wherein the second contact hole, the third contact hole and the fourth contact hole are overlapped with the first contact hole.

2. The display device according to claim 1, wherein the thin film transistor is a top-gate type thin film transistor.

3. The display device according to claim 1, wherein the electrode comprises a titanium film, an aluminum film and a titanium film.

4. The display device according to claim 1, wherein the first insulating film comprises silicon oxide film.

5. The display device according to claim 1, wherein the pixel electrode is a reflecting pixel electrode.

6. The display device according to claim 1, wherein the display device is a liquid crystal panel.

7. An electric device having the display device according to claim 1, wherein the electric device is one selected from the group consisting of a portable information processing terminal, a head mount display, a portable telephone, a video camera and a projector.

8. The display device according to claim 1, further comprising:
a light emitting layer formed over the pixel electrode.

9. The display device according to claim 8, wherein the display device is an EL display.

10. A display device comprising:
a substrate;
a thin film transistor formed over the substrate;
a first insulating film formed over the thin film transistor, the first insulating film having a first contact hole;
an electrode formed over the first insulating film, the electrode being in contact with one of a source region and a drain region of the thin film transistor through the first contact hole;
a second insulating film formed over the electrode, the second insulating film comprising silicon nitride and having a second contact hole;
a capacitance electrode formed over the second insulating film;
a third insulating film formed over the capacitance electrode, the third insulating film having a third contact hole;
an electromagnetic shielding pattern formed over the third insulating film;
a fourth insulating film formed over the electromagnetic shielding pattern, the fourth insulating film comprising an organic resin and having a fourth contact hole; and
a pixel electrode formed over the fourth insulating film, the pixel electrode being in contact with the electrode through the second contact hole, the third contact hole and the fourth contact hole, and being in contact with the second insulating film,
wherein the second contact hole, the third contact hole and the fourth contact hole are overlapped with the first contact hole.

11. The display device according to claim 10, wherein the thin film transistor is a top-gate type thin film transistor.

12. The display device according to claim 10, wherein the electrode comprises a titanium film, an aluminum film and a titanium film.

13. The display device according to claim 10, wherein the first insulating film comprises silicon oxide film.

14. The display device according to claim 10, wherein the pixel electrode is a reflecting pixel electrode.

15. The display device according to claim 10, wherein the display device is a liquid crystal panel.

16. An electric device having the display device according to claim 10, wherein the electric device is one selected from the group consisting of a portable information processing terminal, a head mount display, a portable telephone, a video camera and a projector.

17. The display device according to claim 10, further comprising:
a light emitting layer formed over the pixel electrode.

18. The display device according to claim 17, wherein the display device is an EL display.

19. The display device according to claim 10, wherein the organic resin is one selected from the group consisting of polyimide, polyimideamide, polyamide, acryl and epoxy.

20. A display device comprising:
a substrate;
a thin film transistor formed over the substrate;
a first insulating film formed over the thin film transistor, the first insulating film having a first contact hole;
an electrode formed over the first insulating film, the electrode being in contact with one of a source region and a drain region of the thin film transistor through the first contact hole;
a second insulating film formed over the electrode, the second insulating film comprising silicon nitride and having a second contact hole;
a capacitance electrode formed over the second insulating film;
a third insulating film formed over the capacitance electrode, the third insulating film having a third contact hole;
an electromagnetic shielding pattern formed over the third insulating film;
a fourth insulating film formed over the electromagnetic shielding pattern, the fourth insulating film having a fourth contact hole; and
a pixel electrode formed over the fourth insulating film, the pixel electrode being in contact with the electrode through the second contact hole, the third contact hole and the fourth contact hole, and being in contact with the second insulating film,
wherein the second contact hole, the third contact hole and the fourth contact hole are overlapped with the first contact hole, and
wherein size of the fourth contact hole is larger than that of the second contact hole.

21. The display device according to claim 20, wherein the thin film transistor is a top-gate type thin film transistor.

22. The display device according to claim 20, wherein the electrode comprises a titanium film, an aluminum film and a titanium film.

23. The display device according to claim 20, wherein the first insulating film comprises silicon oxide film.

24. The display device according to claim 20, wherein the pixel electrode is a reflecting pixel electrode.

25. The display device according to claim 20, wherein the display device is a liquid crystal panel.

26. An electric device having the display device according to claim 20, wherein the electric device is one selected from the group consisting of a portable information processing terminal, a head mount display, a portable telephone, a video camera and a projector.

27. The display device according to claim 20, further comprising:
   a light emitting layer formed over the pixel electrode.

28. The display device according to claim 27, wherein the display device is an EL display.

29. The display device according to claim 20, wherein the fourth insulating film comprises a diamond-like carbon film.

* * * * *